United States Patent
Ito et al.

(10) Patent No.: US 6,996,981 B2
(45) Date of Patent: Feb. 14, 2006

(54) ROTATIONALLY BALANCED HYDRAULIC SWASH PLATE PLUNGER UNIT, AND HYDRAULIC CONTINUOUSLY VARIABLE TRANSMISSION INCORPORATING SAME

(75) Inventors: Katsuhiko Ito, Saitama (JP); Yasushi Fujimoto, Saitama (JP); Hideo Okuzaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 10/801,483

(22) Filed: Mar. 16, 2004

(65) Prior Publication Data

US 2004/0226295 A1 Nov. 18, 2004

(30) Foreign Application Priority Data

Mar. 31, 2003 (JP) .............................. 2003-096812

(51) Int. Cl.
*F16H 39/14* (2006.01)
(52) U.S. Cl. ................. 60/487; 60/489; 92/71
(58) Field of Classification Search .................. 60/489, 60/487; 92/57, 71; 74/573 B
See application file for complete search history.

(56) References Cited

U.S. PATENT DOCUMENTS 3,698,189 A * 10/1972 Reimer ......................... 60/489
6,474,218 B2 * 11/2002 Saito et al. ...................... 92/71
6,530,218 B2 * 3/2003 Saito et al. .................... 60/489
6,698,199 B2 * 3/2004 Hayashi et al. ............... 60/489

FOREIGN PATENT DOCUMENTS

JP 63140163 6/1988
JP 06002753 1/1994

* cited by examiner

*Primary Examiner*—Edward K. Look
*Assistant Examiner*—Igor Kershteyn
(74) *Attorney, Agent, or Firm*—Carrier, Blackman & Associates, P.C.; William D. Blackman; Joseph P. Carrier (57) ABSTRACT

In order to provide a rotationally balanced hydraulic swash plate plunger unit, a swash plate plunger pump casing is provided with an unbalanced flange to balance a casing which has a swash plate member therein, without requiring a separate counter weight. A hydraulic swash plate plunger pump includes a pump swash plate member, installed in the pump casing and rotatably supported in an inclined manner therein, and a pump cylinder having a plurality of pump plungers slidably disposed therein. An unbalanced five-sided flange portion is formed integrally with the outer wall of the pump casing, to rotationally balance the entire unit.

15 Claims, 9 Drawing Sheets

ROTATIONALLY BALANCED HYDRAULIC SWASH PLATE PLUNGER UNIT, AND HYDRAULIC CONTINUOUSLY VARIABLE TRANSMISSION INCORPORATING SAME

CROSS-REFERENCE TO RELATED APPLICATIONS

The present invention claims priority under 35 USC 119 based on Japanese patent application No. 2003-096812, filed Mar. 31, 2003.

BACKGROUND OF THE INVENTION

1. Field of the Invention

The present invention relates to a rotationally balanced hydraulic swash plate plunger unit, such as a swash plate plunger pump or swash plate plunger motor, and to a hydraulic continuously variable transmission incorporating the novel swash plate plunger unit. More particularly, the present invention relates to a rotationally balanced hydraulic swash plate plunger unit of a fixed capacity type in which the angle of a swash plate is fixed, and to a hydraulic continuously variable transmission incorporating the swash plate plunger unit.

2. Description of the Background Art

Various hydraulic continuously variable transmissions have been known and used, many of these known transmissions including a combination of a hydraulic pump and a hydraulic motor.

One example of a commercial hydraulic continuously variable transmission was sold by Honda and marketed under the trademark "Hondamatic" on the 2001 Honda Fourtrax Foreman Rubicon™ TRX500 ATV.

Other examples of hydraulic continuously variable transmissions are disclosed in Japanese Disposed-open Patent publications JP-A 6-2753 and JP-B 7-88884, proposed by the applicant of the present application. Each of the hydraulic continuously variable transmissions disclosed by these patent documents comprises a swash plate plunger pump, a swash plate plunger motor and a hydraulic closing circuit for connecting the outlet port and inlet port of the swash plate plunger pump to the inlet port and outlet port of the swash plate plunger motor, respectively, wherein a pump swash plate member is driven by an engine.

The referenced transmissions also include a pump cylinder and a motor cylinder connected to each other above the output shaft of the engine, in which the rotation of a motor swash plate member is restricted, and the angle of a motor swash plate can be changed.

In this hydraulic continuously variable transmission, a pump cylinder and a motor cylinder are connected to each other back to back, and pump and motor distributor valves (distributor valves) are arranged in this connection portion, to constitute a hydraulic closing circuit. The pump and motor distributor valves supply oil discharged from pump plungers which are reciprocated in the pump cylinder by the revolution of a pump swash plate into a motor cylinder chamber to push motor plungers so that they are moved in an axial direction in slide contact with a motor swash plate to drive the motor cylinder.

In the above hydraulic pump, a pump casing is rotatably supported and driven by input rotation, and a swash plate member is installed in this pump casing in such a manner that it is inclined at a predetermined angle. Since this swash plate member is inclined, the shape of the pump casing is not rotationally symmetrical (that is, cylindrical or circular) but rotationally asymmetrical. Therefore, when the pump casing is turned as it is, rotation becomes unbalanced. Accordingly, to prevent this unbalanced rotation, a counter weight for balancing is installed in the pump casing in the previously known transmission.

However, a weight increase is resulted by installing the counter weight, and steps for producing the counter weight separately and for installing it are required, thereby boosting production costs.

Although the known hydraulic continuously variable transmissions have some utility for their intended purposes, there is still a need to provide an improved hydraulic swash plate plunger unit such as a swash plate plunger pump or swash plate plunger motor. More particularly, there is a need for a swash plate servo device for tilting and rolling a swash plate in a hydraulic swash plate plunger unit such as a swash plate plunger pump or swash plate plunger motor.

SUMMARY OF THE INVENTION

In view of the above problems, it is an object of the present invention to provide an improved hydraulic swash plate plunger unit which can balance a casing having a swash plate member, and which can be balanced without using a separate counter weight.

To attain the above object, according to an illustrative embodiment of the present invention, a hydraulic swash plate plunger unit is provided including a rotatably supported casing having a central axis of rotation, and a swash plate member which is installed in the casing, in such a manner that it is inclined at a predetermined angle with respect to the central axis of rotation. The hydraulic swash plate plunger unit is one component part of a hydraulic continuously variable transmission for a vehicle.

The hydraulic swash plate plunger unit according to the embodiment also includes a cylinder, and a plurality of plungers which are slidably disposed in respective plunger holes of the cylinder. The cylinder is rotatably installed in the casing, and has a plurality of plunger holes formed therein, extending in an axial direction and arranged in a cylindrical pattern surrounding the central axis of rotation.

During operation of the transmission, the casing is turned relative to the cylinder, so that the outer end portions of the plungers are pushed by the swash plate member to reciprocate the plungers in the plunger holes. A balance portion, which is formed rotationally asymmetrically, is provided integrated with the outer wall of the casing, to balance the rotation thereof.

Preferably, a cylindrical mating portion (for example, step joint 202 in the embodiment) to be mated with an input gear member which receives driving torque (for example, input slave gear 5 in the embodiment) is formed on the outer wall of the casing, and a flange portion is formed at the end of the cylindrical mating portion, and this flange portion is formed rotationally asymmetrical to form the balance portion. The side face of the input gear member abuts against, and is attached to the flange portion. The balance portion is preferably polygonal and rotationally asymmetrical.

According to the hydraulic swash plate plunger unit constituted as described above, as the balance portion (flange portion) formed on the outer wall of the casing is rotationally asymmetrical to balance the countervailing rotation of the swash plate member, so that a separate counter weight does not need to be used, thereby making it possible to eliminate an increase in overall unit weight caused by the counter weight, as seen in the prior art. Particularly, by using the balance portion as the flange portion to be contacted to the end face of the input gear member to be fixed, the balance portion serves as the flange portion and therefore can be used effectively, thereby making it possible to avoid a weight increase.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 2:
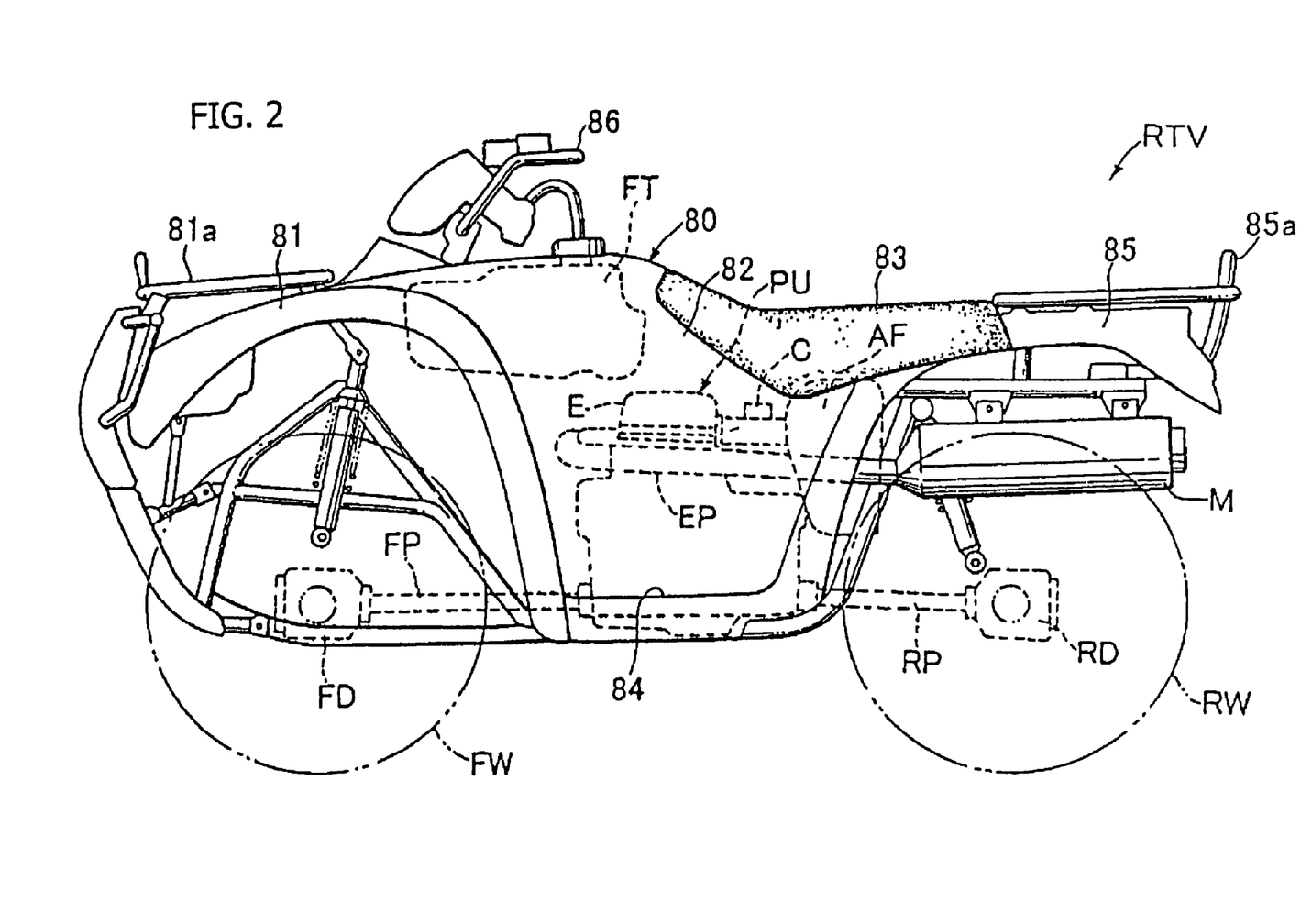
FIG. 2 is a side elevational view of a rough terrain vehicle having the above hydraulic continuously variable transmission according to an embodiment of the present invention.
Figure 3:
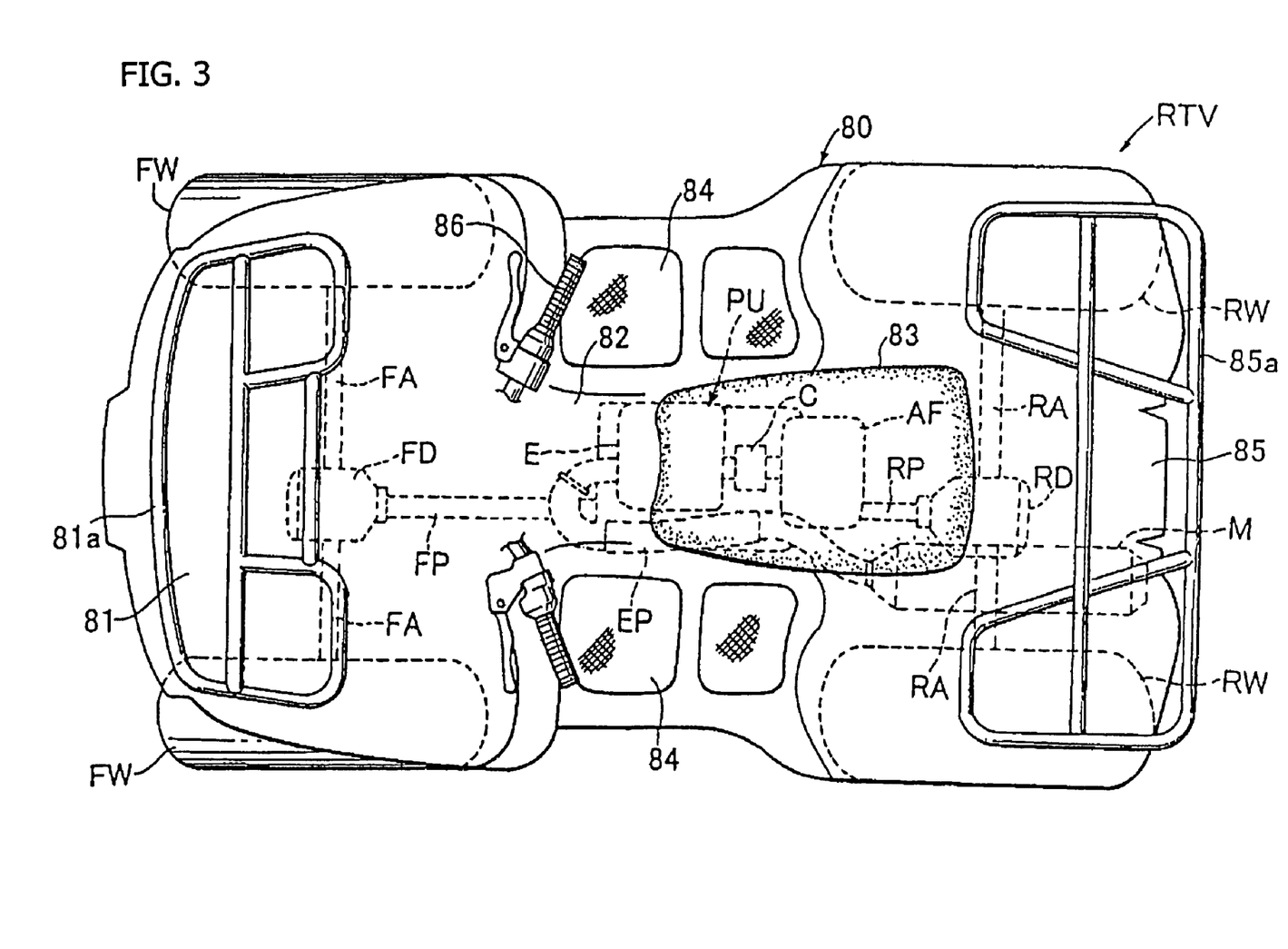
FIG. 3 is a top plan view of the rough terrain vehicle having the above hydraulic continuously variable transmission according to an embodiment of the present invention.
Figure 4:
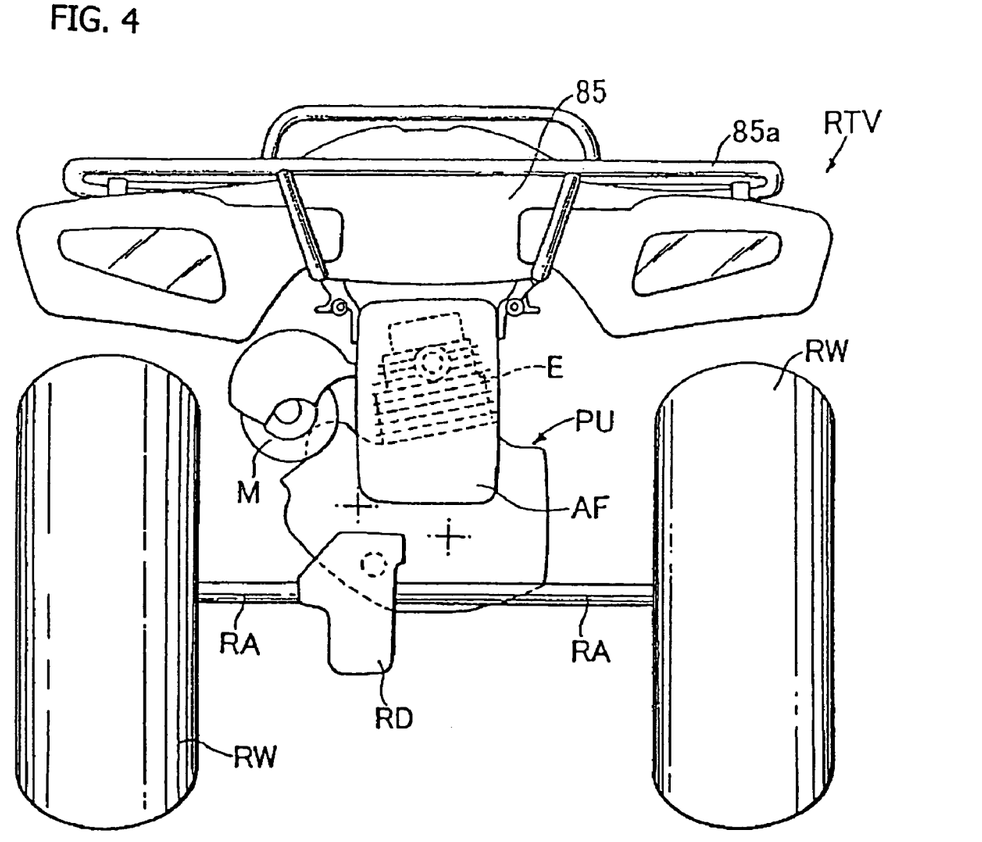
FIG. 4 is a rear elevational view of the rough terrain vehicle having the above hydraulic continuously variable transmission according to an embodiment of the present invention.

An embodiment of the present invention will be described hereinbelow with reference to the drawings. First, FIGS. 2 to 4 show a rough terrain vehicle (RTV) having a hydraulic continuously variable transmission, including a hydraulic swash plate plunger unit according to the present invention used therein as a hydraulic pump. This vehicle (RTV) incorporates a power unit (PU) in a car body 80 having a frame structure therein and has front wheels (FW) and rear wheels (RW) which are driven by the output of the power unit (PU).

The car body 80 comprises a front fender 81 situated at the front of the car body and provided with a front guard 81a, a saddle 82 which extends longitudinally and projects upward from the center of the car body, right and left steps 84 and 84 which extend downward from the right and left sides of the saddle 82 in right and left directions, and a rear fender 85 situated at the rear of the car body and provided with a rear guard 85a. The saddle 82 is provided with a seat 83 for a driver.

Figure 1:
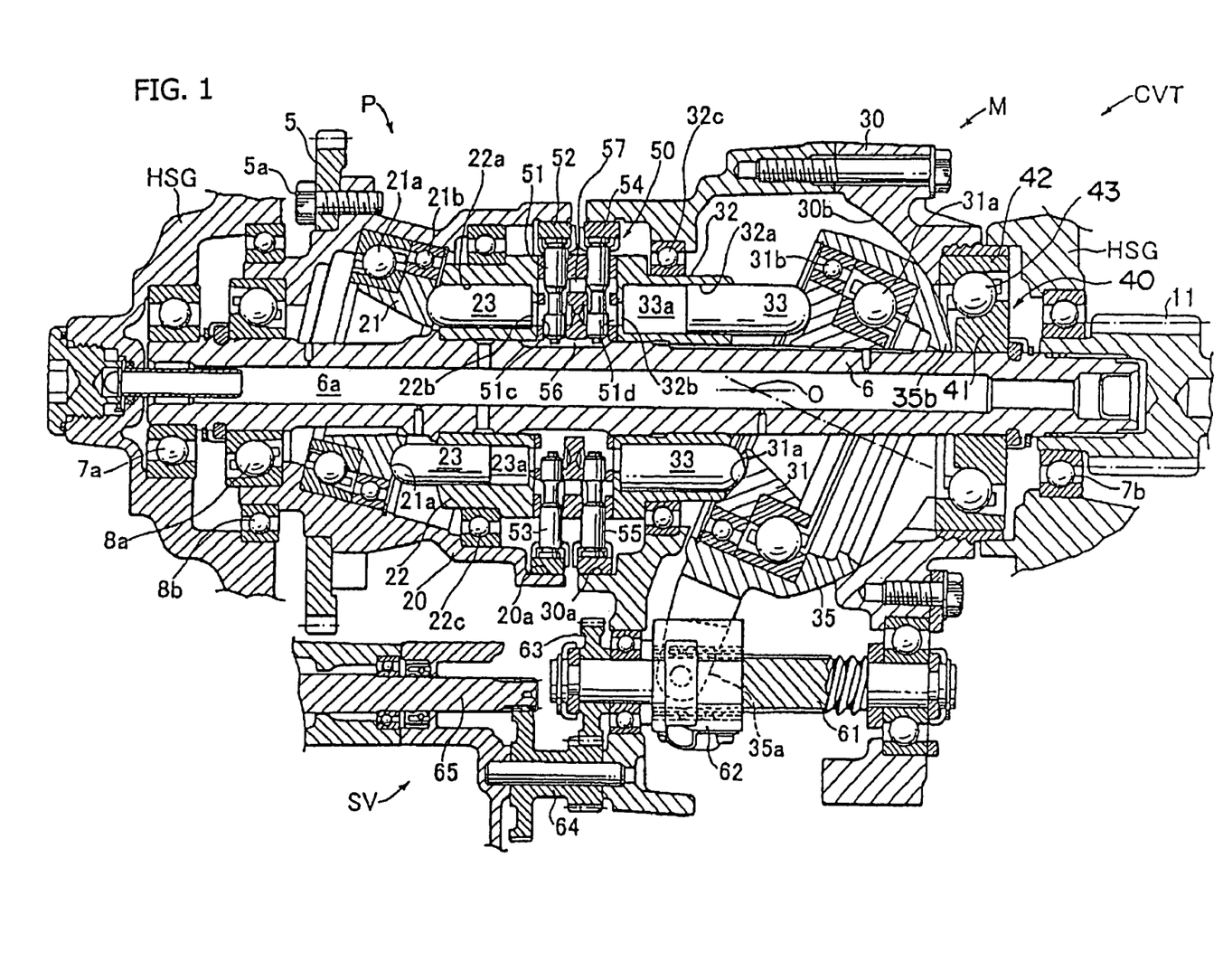
FIG. 1 is a sectional view of a hydraulic continuously variable transmission comprising a hydraulic swash plate plunger unit according to an illustrative embodiment of the present invention.

The driver (not shown), who strides over the saddle 82 to sit on the seat 83, puts his/her feet on the right and left steps 84 and manipulates a steering handle 86 which is situated in front of him/her, and can be pivotally turned in right and left directions. A fuel tank (FT) is arranged in front of the saddle 82 as shown in FIG. 1.

The saddle 82 extends above and covers the power unit (PU), which comprises an engine (E), main clutch (CL), hydraulic continuously variable transmission (CVT) and transmission gear train (GT) as will be described hereinafter. The engine (E) takes in an air-fuel mixture prepared by mixing together air absorbed through an air filter (AF) and fuel in a fuel tank (FT) in a carburetor (C) and burns it in a cylinder to generate driving torque. An exhaust gas which is produced after burning in the cylinder is discharged from an exhaust pipe (EP) through a muffler (M).

The driving torque of the engine (E) is transmitted from the crank shaft to the main clutch (CL), hydraulic continuously variable transmission (CVT) and transmission gear train (GT) while its speed is changed and output to front and rear propeller shafts (FP, RP). The front propeller shaft (FP) is connected to a front differential mechanism (FD) so that the driving torque output to the front propeller shaft (FP) is transmitted from the front differential mechanism (FD) to the right and left front wheels (FW) through right and left front axle shafts (FA), so as to drive the front wheels (FW). The rear propeller shaft (RP) is connected to a rear differential mechanism (RD) so that the driving torque output to the rear propeller shaft (RP) is transmitted from the rear differential mechanism (RD) to the right and left rear wheels (RW) through right and left rear axle shafts (RA), so as to drive the rear wheels (RW).

Figure 5:
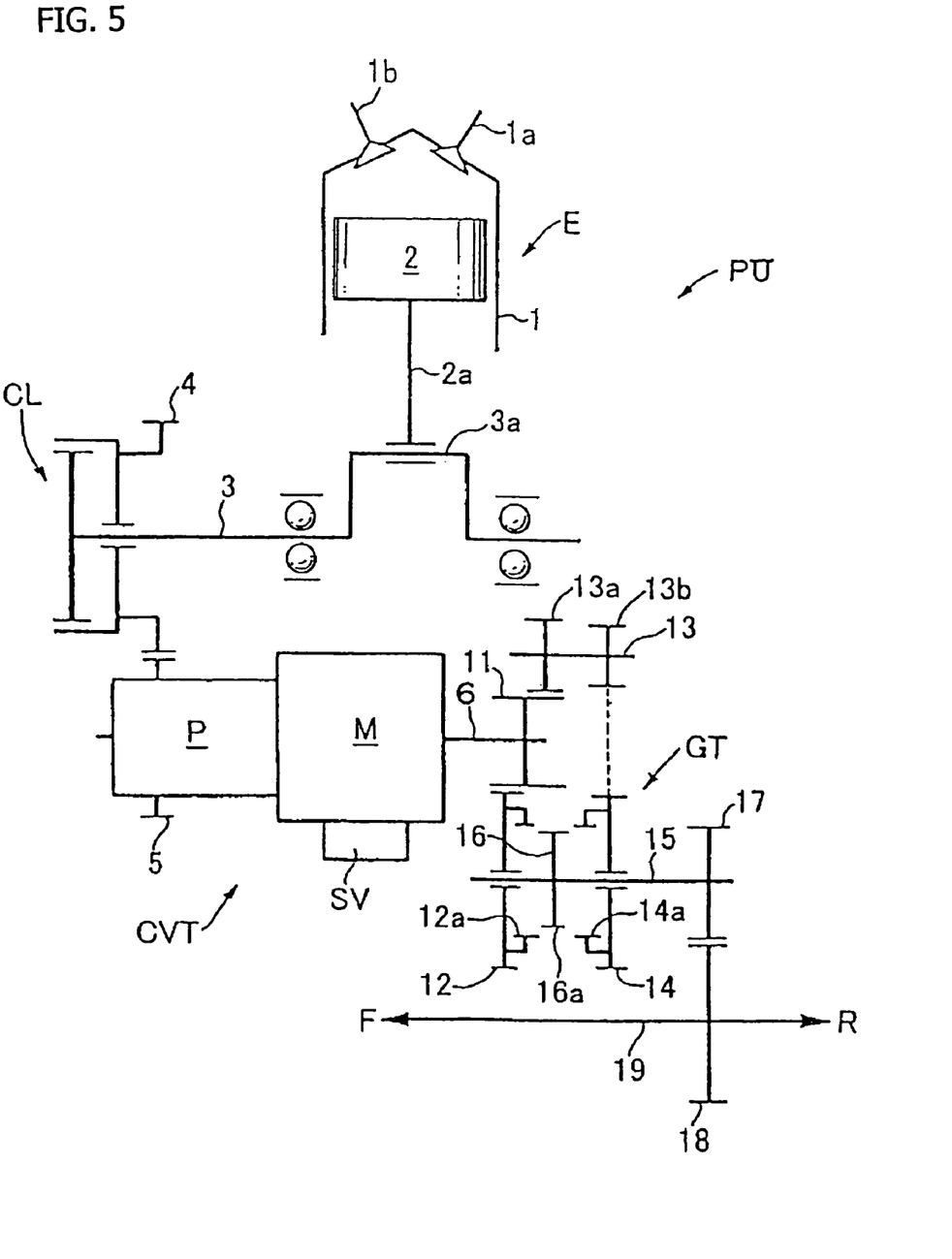
FIG. 5 is a schematic diagram showing the power transmission line of a power unit having the above hydraulic continuously variable transmission according to an embodiment of the present invention.

A description is subsequently given of the above power unit (PU) with reference to FIG. 5. The power unit (PU) comprises the engine (E) for generating driving torque, the main clutch (CL) for controlling the transmission of the driving torque, the hydraulic continuously variable transmission (CVT) for changing the driving torque transmitted through the main clutch (CL) continuously, and the transmission gear train (GT) for changing the direction of and transmitting the output revolution of the hydraulic continuously variable transmission (CVT). The power unit (PU) is installed below the saddle 82 in such a manner that the engine crank shaft extends in the longitudinal direction of the car body.

The engine (E) is provided with a piston 2 in a cylinder 1 having feed and exhaust valves 1a and 1b in its head portion. In the engine (E), air absorbed through the air filter (AF) is mixed with fuel in the fuel tank (FT) in the carburetor (C) to prepare an air-fuel mixture as described above, the air-fuel mixture is supplied into the cylinder chamber by opening the feed valve 1a at a predetermined timing and burned in the cylinder chamber to reciprocate the piston 2. This reciprocation of the piston 2 is transmitted to a crank 3a by a connection rod 2a, and a crank shaft 3 is turned. The main clutch (CL) is provided at the end of the crank shaft 3 to control engagement/disengagement between an input drive gear 4 rotatably installed on the crank shaft 3 and the crank shaft 3. Therefore, the driving torque of the crank shaft 3 is transmitted to the input drive gear 4 in accordance with the control of engagement/disengagement by the main clutch (CL). The main clutch (CL) may be a centrifugal clutch, for example.

The hydraulic continuously variable transmission (CVT) has a hydraulic swash plate plunger pump (P) and a hydraulic swash plate plunger motor (M). An input slave gear 5, connected to a pump casing constituting the hydraulic swash plate plunger pump (P), engages with the above input drive gear 4, so that the driving torque of the engine (E) is transmitted to the input slave gear 5 to turn the pump casing. The output revolution whose speed is continuously changed by the hydraulic continuously variable transmission (CVT), to be described in detail hereinafter, is output to a transmission output shaft 6.

The transmission output shaft 6 is connected to a transmission output gear 11 constituting the above transmission gear train (GT) to transmit the revolution of the transmission output shaft 6 from the transmission output gear 11 through the transmission gear train (GT). The transmission gear train (GT) has a counter shaft 15 and an idler shaft 13 arranged parallel to the transmission output shaft 6. The counter shaft 15 is fitted with a forward gear 12 and a backward gear 14 in such a manner that they can turn freely, and connected to an output drive gear 17. Meanwhile, the idler shaft 13 is connected to a first idler gear 13a and a second idler gear 13b. The forward gear 12 engages with the transmission output gear 11, and the first idler gear 13a also engages with the transmission output gear 11. The second idler gear 13b engages with the backward gear 14.

The forward gear 12 and the backward gear 14 are provided with internal clutch gears 12a and 14a, respectively, and a clutch sleeve 16 which can turn together with the counter shaft 15 to be moved in an axial direction is provided between the forward gear 12 and the backward gear 14. An external clutch gear 16a is formed on the clutch sleeve 16 to move the clutch sleeve 16 in the axial direction to be selectively engaged with the internal clutch gear 12a or 14a, thereby constituting a dog-tooth clutch. This clutch sleeve 16 is moved in the axial direction by the driver's manipulation of a shift lever to a forward movement side or backward movement side.

When the driver moves the shift lever to the forward movement side, the clutch sleeve 16 is moved in the left direction in the figure, and the external clutch gear 16a is engaged with the internal clutch gear 12a to connect the forward gear 12 to the counter shaft 15. Therefore, in this state, the revolution of the transmission output gear 11 is transmitted from the forward gear 12 to the counter shaft 15 to turn the output drive gear 17.

When the driver moves the shift lever to the backward movement side, the clutch sleeve 16 is moved in the right direction in the figure, and the external clutch gear 16a is engaged with the internal clutch gear 14a to connect the backward gear 14 to the counter shaft 15. In this state, the revolution of the transmission output gear 11 is transmitted from the first idler gear 13a to the second idler gear 13b through the idler shaft 13 and further from the second idler gear 13b to the counter shaft 15 through the backward gear 14 engaged with the second idler gear 13b to turn the output drive gear 17. The revolution direction of the output drive gear 17 at this point is the opposite direction (backward direction) to the direction when the shift lever is moved to the above forward movement side.

The output drive gear 17 engages with the output slave gear 18 connected to a drive shaft 19 so that the revolution of the output drive gear 17 is transmitted to the drive shaft 19 through the output slave gear 18. The front end of the drive shaft 19 is linked to the front propeller shaft (FP) and the rear end of the drive shaft 19 is linked to the rear propeller shaft (RP) so that the driving torque transmitted to the drive shaft 19 is transmitted to the front and rear propeller shafts (FP, RP), whereby the front and rear wheels (FW, RW) are driven as described above.

A description of a hydraulic continuously variable transmission (CVT) according to an illustrative embodiment of the present invention is given below, with reference to FIG. 1 and FIGS. 6 to 8. The hydraulic continuously variable transmission (CVT) includes the hydraulic swash plate plunger pump (P) and the hydraulic swash plate plunger motor (M), and the transmission output shaft 6 extends through the hydraulic continuously variable transmission (CVT) passing the center thereof. The transmission output shaft 6 is rotatably supported in a transmission housing (HSG) such that it can turn on ball bearings 7a and 7b.

The hydraulic pump (P) includes a pump casing 20 which is rotatably supported in the housing HSG. The pump casing 20 is mounted to the transmission output shaft 6 in such a manner that it is coaxial to, and rotated relative to the transmission output shaft 6. The hydraulic pump (P) also includes a pump swash plate member 21 which is installed in the pump casing 20 and inclined at a predetermined angle from the rotation axis of the pump casing 20.

The hydraulic pump (P) further includes a pump cylinder 22 which is opposed to the pump swash plate member 21, and a plurality of pump plungers 23 which are slidably disposed in a plurality of pump plunger holes 22a, formed in the axial direction and arranged in a cylindrical pattern surrounding the center axis of the pump cylinder 22. The pump casing 20 is supported on the transmission output shaft 6 such that it can turn on an inner bearing 8a, and is also supported in the transmission housing (HSG) such that it can turn inside an outer bearing 8b.

The pump swash plate member 21 is installed in the pump casing 20 in such a manner that it can turn on an axis inclined at the above predetermined angle by bearings 21a and 21b. The pump cylinder 22 is supported in the pump casing 20, in such a manner that it can turn in a bearing 22c relative to and coaxial to the pump casing 20.

The input slave gear 5 is fastened onto the pump casing 20 by a bolt 5a. The outer end portion of each of the pump plungers 23 projects outward and the plunger ends contact and engage the swash plate face 21a of the pump swash plate member 21. The inner end portion of each pump plunger 23, situated in the pump plunger hole 22a, is opposed to the valve body 51 of a distributor valve 50, which will be described hereinafter, to form a pump oil chamber 23a in the pump plunger hole 22a. A pump opening 22b, which serves as the outlet and inlet of the pump, is formed at the end of the pump plunger hole 22a.

During operation of the transmission CVT, when the input slave gear 5 is turned, the pump casing 20 is turned as described above, and the pump swash plate member 21, situated in the pump casing 20, is moved by the rotation of the pump casing 20. The pump plungers 23 are sequentially reciprocated in the pump plunger holes 22a by the oscillating movement of the swash plate face 21a, to alternately apply compressive and expansive forces to hydraulic oil in the pump oil chambers 23a.

Figure 9A:
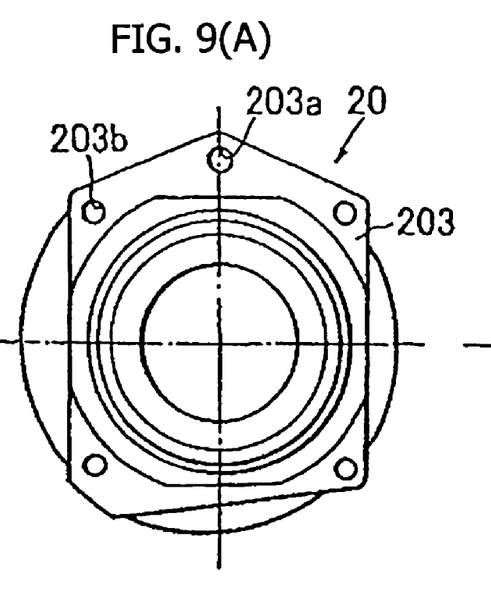
FIGS. 9(a) and (b) are a side view and a front view of a pump casing of the hydraulic continuously variable transmission according to an embodiment of the present invention.
Figure 9B:
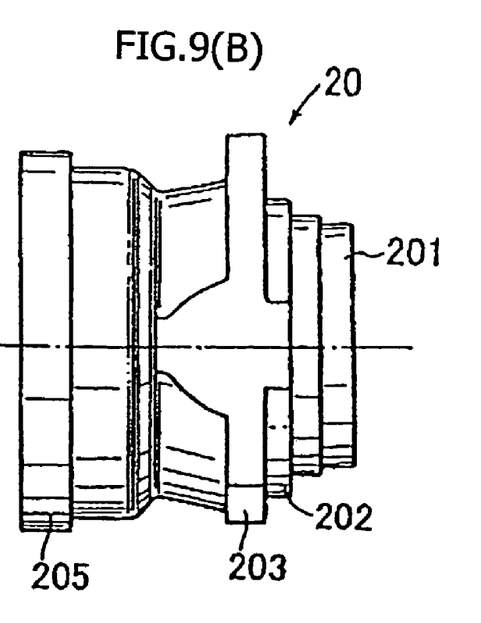

Since the pump casing 20 holds the pump swash plate member 21 therein in such a manner that it is inclined at a predetermined angle, the pump swash plate member 21 is rotationally asymmetrical to the central axis of rotation of the pump casing 20. Since the input slave gear 5 rotates the pump casing 20 at a relatively high speed, when the pump swash plate member 21 is rotationally asymmetrical, rotation becomes unbalanced. Therefore, the rotation speed may change, or rotational vibration may occur. Accordingly, the pump casing 20 according to the present invention is constituted such that the imbalance of rotation can be adjusted or eliminated. This will be described with reference to FIG. 7 and FIG. 9.

Figure 7:
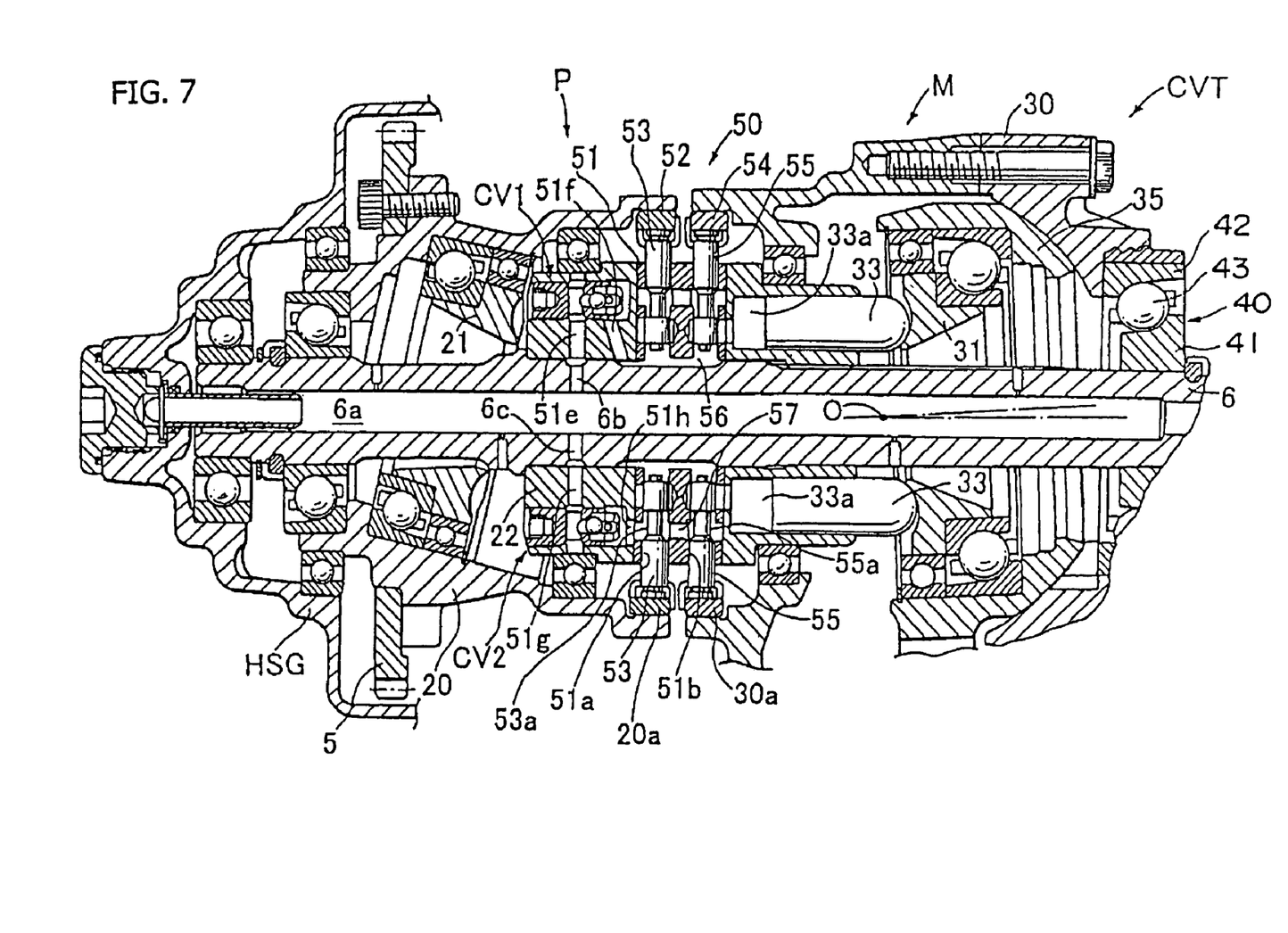
FIG. 7 is another sectional view of the above hydraulic continuously variable transmission according to an embodiment of the present invention.

The pump casing 20 includes a cylindrical support hub portion 201 supported by inner and outer bearings 8a and 8b, respectively, a step joint 202 to be mated with the input salve gear 5, and a flange portion 203. The side face of the input slave gear 5, mated with this step joint 202, is abutted against the flange portion 203 to determine its position in the axial direction. The pump casing 20 also includes a cylindrical end support portion 205, having an eccentric inner wall 20a onto which a pump-side cam ring 52 is fitted eccentrically. The pump casing 20 is formed as a single integral unit, including all of the above-mentioned components.

The pump swash plate member 21 is installed in the pump casing 20 in an axially inclined manner as described above. As a result of this inclination, a portion of the pump casing 20, provided for supporting the pump swash plate member 21 by bearings 21a and 21b, is rotationally asymmetrical and nonuniform in thickness in the circumferential direction, and the end support portion 205 is cylindrical and eccentric to the center of rotation. Therefore, if left uncorrected, the rotary balance position of the pump casing 20 will initially be shifted from the central axis of rotation when seen from the side, thereby causing unbalanced rotation.

In the depicted pump casing 20, the flange portion 203 is formed in an irregular five-sided polygon, as shown in FIG. 9(A), to cancel the above-mentioned unbalanced rotation. That is, the flange portion 203 is formed rotationally asymmetrical to set the weighted center of the whole pump casing 20 back on the central axis of its rotation, thereby preventing unbalanced rotation. Thereby, even when the input slave gear 5 rotates the pump casing 20 at a relatively high speed, unbalanced rotation is reduced or eliminated, and a rotation change and the occurrence of rotational vibration can be suppressed.

A knock pin hole 203a and a plurality of bolt insertion holes 203b are formed in the flange portion 203, as illustrated in FIG. 9. A knock pin, inserted into the knock pin hole 203a, determines the aligned position of the flange portion 203 in the rotational direction, and the input slave gear 5 is fixed to the pump casing 20 by bolts 5a inserted into the bolt insertion holes 203b. Therefore, a counteracting rotational imbalance may be provided to the input slave gear 5, for canceling unbalanced rotation of the pump casing 20.

The hydraulic motor M includes a motor casing 30, which is connected to the transmission housing (HSG) to be fixed and held thereon. The hydraulic motor M also includes a motor pivot member 35 which is in sliding contact with a concave hemispherical support socket 30a, formed on the inner wall of the motor casing 30. The motor pivot member 35 is supported so that it can pivotally turn about a central axis O, extending in a direction perpendicular the sheet of the figure, and perpendicular to the central axis of the transmission output shaft 6.

The hydraulic motor M further includes a motor swash plate member 31, rotatably supported in the motor pivot member 35 such that it can turn relative to bearings 31a and 31b. The hydraulic motor M also includes a motor cylinder 32, opposed to the motor swash plate member 31, and a plurality of motor plungers 33 which are slidably disposed in a plurality of motor plunger holes 32a formed in the motor cylinder. The plunger holes 32a are oriented in the axial direction, and arranged in a cylindrical pattern surrounding the center axis of the motor cylinder 32. The motor cylinder 32 is supported in the motor casing 30 such that it can turn on a bearing 32c.

The outer end portion of each of the motor plungers 33 projects outwardly, and abuts against and engages with the swash plate face 31a of the motor swash plate member 31. An inner end portion of each of the motor plungers 33, situated in the plunger hole 32a, is opposed to the valve body 51 to form a motor oil chamber 33a in the motor plunger hole 32a. A motor opening 32b, which serves as the outlet and inlet of the motor M, is formed at the end of the motor plunger hole 32a.

An arm portion 35a, which projects outwardly from the end of the motor pivot member 35 in the radial direction, is connected to a motor servo mechanism (SV) which controls the horizontal movement of the arm portion 35a, to control the pivotal movement of the motor pivot member 35 on the pivot axis O. When the motor pivot member 35 is turned, the motor swash plate member 31, which is rotatably supported in the motor pivot member 35, is also turned, and the angle of its swash plate is changed.

The distributor valve 50 is provided between the pump cylinder 22 and the motor cylinder 32. The valve body 51 of the distributor valve 50 is sandwiched between and integrally connected to the pump cylinder 22 and the motor cylinder 32 and also connected to the transmission output shaft 6. Therefore, the pump cylinder 22, distributor valve 50, motor cylinder 32 and transmission output shaft 6 turn together.

To show reference symbols clearly in FIG. 7 in particular, a plurality of pump-side spool holes 51a and a plurality of motor-side spool holes 51b extending in the radial direction are formed in two rows in the valve body 51 constituting the distributor valve 50 at equal intervals in the circumferential direction. Pump-side spools 53 are slidably disposed in the pump-side spool holes 1a, and motor-side spools 55 are slidably disposed in the motor-side spool holes 51b.

The pump-side spool holes 51a are formed corresponding to the pump plunger holes 22a, and a plurality of pump-side communication paths 51c communicating with the respective pump openings 22b (pump oil chamber 23a) and the respective pump-side spool holes 51a are formed in the valve body 51. The motor-side spool holes 51b are formed corresponding to the motor plunger holes 32a, and a plurality of motor-side communication paths 51d communicating with the respective motor openings 32b (motor oil chamber 33a) and the respective motor-side spool holes 51b are formed in the valve body 51 (see FIG. 1).

In the distributor valve 50, a pump-side cam ring 52 is disposed at a position surrounding the outer ends of the pump-side spools 53, and a motor-side cam ring 54 is disposed at a position surrounding the outer ends of the motor-side spools 55. The pump-side cam ring 52 is mounted on the eccentric inner face 20a formed eccentric to the center axis of the rotation of the pump casing 20 on the inner wall at the end of the pump casing 20 so that it is turned together with the pump casing 20. The motor-side cam ring 54 is mounted on the eccentric inner face 30a formed eccentric to the center axis of the rotation of the motor cylinder 32 on the inner wall at the end of the motor casing 30.

The outer ends of the pump-side spools 53 are secured to the inner wall of the pump-side cam ring 52 in such a manner that they can turn relative to the pump-side cam ring 52, and the outer ends of the motor-side spools 55 are secured to the inner wall of the motor-side cam ring 54 in such a manner that they can turn relative to the motor-side cam ring 54.

An inner path 56 is formed between the inner wall of the valve body 51 and the outer wall of the transmission output shaft 6, and the inner ends of the pump-side spool holes 51 and the motor-side spool holes 51b communicate with this inner path 56. An outer path 57, which communicates with the pump-side spool holes 51a and the motor-side spool holes 51b, is formed in the valve body 51.

A description is subsequently given of the operation of the above-described distributor valve 50. When the drive force of the engine (E) is transmitted to the input slave gear 5 to turn the pump casing 20, the pump swash plate member 21 is rolled by this revolution. Therefore, the pump plungers 23, which are contacted to and engaged with the swash plate faces 21a of the pump swash plate member 21, are reciprocated in the axial direction in the respective pump plunger holes 22a by the rolling of the pump swash plate member 21. Hydraulic oil is discharged from the pump oil chambers 23a through the pump openings 22b by the inward movements of the pump plungers 23, and absorbed into the pump chambers 23a through the pump openings 22b by the outward movements of the pump plungers 23.

Although the pump-side cam ring 52 mounted to the end of the pump casing 20 is turned together with the pump casing 20, the pump-side spools 53 are reciprocated in the radial direction in the respective pump-side spool holes 51a by the revolution of the pump-side cam ring 52 as it is mounted eccentric to the rotation center of the pump casing 20.

When the pump-side spools 53 are thus reciprocated and moved to their inner-diameter side as shown in the upper half part of FIG. 1, the pump-side communication paths 51c and the outer path 57 communicate with each other through spool grooves 53a and when the pump-side spools 53 are moved to their outer-diameter side as shown in the lower half part of FIG. 1, the pump-side communication paths 51c and the inner path 56 communicate with each other through the spool grooves 53a.

When the swash plate member 21 is rolled by the revolution of the pump casing 20 to reciprocate the pump plungers 23, the position of eccentricity is set such that the pump-side cam ring 52 moves the pump-side spools 53 to their inner-diameter side during the half round of the pump casing 20 during which the pump plungers 23 are moved from a position where they are pushed the most outward (to be referred to as "bottom dead center") to a position where they are pushed the most inward (to be referred to as "top dead center") and to their outer-diameter side during the half round of the pump casing 20 during which the pump plungers 23 are moved from the top dead center to the bottom dead center.

As a result, when the pump plungers 23 are moved from the bottom dead center to the top dead center by the revolution of the pump casing 20 to discharge the hydraulic oil in the pump oil chambers 23a from the pump openings 22b, this hydraulic oil is supplied into the outer path 57 through the pump-side communication paths 51c. When the pump plungers 23 are moved from the top dead center to the bottom dead center by the revolution of the pump casing 20, the hydraulic oil in the inner path 56 is absorbed into the pump oil chambers 23a through the pump-side communication paths 51c and the pump openings 22b. As understood from this, when the pump casing 20 is turned, the hydraulic oil discharged from the hydraulic pump (P) is supplied into the outer path 57 and absorbed into the hydraulic pump (P) from the inner path 56.

Since the motor-side cam ring 54 attached to the end of the motor casing 30 is also mounted eccentric to the rotation center of the motor casing 30, when the motor cylinder 32 is turned, the motor-side spools 55 are reciprocated in the radial direction in the respective motor-side spool holes 51b by the revolution of the motor cylinder 32. When the motor-side spools 55 are thus reciprocated and moved to their inner-diameter side as shown in the upper half part of FIG. 1, the motor-side communication paths 51d and the outer path 57 communicate with each other through the spool grooves 55a. Conversely, when the motor-side spools 55 are moved to their outer-diameter side as shown in the lower half part of FIG. 1, the motor-side communication paths 51d and the inner path 56 communicate with each other through the spool grooves 55a.

The hydraulic oil discharged from the hydraulic pump (P) is supplied into the outer path 57 as described above and further the motor oil chambers 33a from the motor-side communication paths 51d through the motor openings 32b, and the motor plungers 33 are pushed outward in the axial direction. The outer ends of the motor plungers 33 which receive outward pressure in the axial direction are slidably contacted to a portion from the top dead center to the bottom dead center of the motor swash plate member 31 while the motor pivot member 35 is rolled as shown in FIG. 1. The motor cylinder 32 is turned so that the motor plungers 33 are moved from the top dead center to the bottom dead center along with the motor swash plate member 31 by this outward pressure in the axial direction.

To carry out this revolution, the position of eccentricity of the motor-side cam ring 54 is set such that when the motor plungers 33 are reciprocated along with the inclination of the motor swash plate member 31 by the revolution of the motor cylinder 32, the motor-side cam ring 54 moves the motor-side spools 55 to their outer-diameter side during the half round of the motor cylinder 32 during which the motor plungers 33 are moved from a position (bottom dead center) where they are pushed the most outward to a position where they are pushed the most inward (top dead center) and to their outer-diameter side during the half round of the motor cylinder 32 during which the motor plungers 33 are moved from the top dead center to the bottom dead center.

When the motor cylinder 32 is thus turned, the motor plungers 33 are pushed inward while they are moved from the bottom dead center to the top dead center along with the motor swash plate member 31 by this revolution, and hydraulic oil in the motor oil chambers 33a is supplied into the inner path 56 from the motor openings 32b through the motor-side communication paths 51d. Thus, hydraulic oil supplied into the inner path 56 is absorbed into the pump oil chambers 23a through the pump-side communication paths 51c and the pump openings 22b as described above.

As understood from the above description, when the pump casing 20 is turned by the driving torque of the engine (E), hydraulic oil is discharged into the outer path 57 from the hydraulic pump (P) and supplied into the hydraulic motor (M) to turn the motor cylinder 32. The hydraulic oil which has turned the motor cylinder 32 is supplied into the inner path 56 and absorbed into the hydraulic pump (P) from the inner path 56. Thus, a hydraulic closing circuit for connecting the hydraulic pump (P) to the hydraulic motor (M) is composed of the distributor valve 50, the hydraulic oil discharged from the hydraulic pump (P) by the revolution of the hydraulic pump (P) is supplied into the hydraulic motor (M) through the hydraulic closing circuit to drive the hydraulic motor (M), and the hydraulic oil discharged by driving the hydraulic motor (M) is returned to the hydraulic pump (P) through the hydraulic closing circuit.

Since the pump cylinder 22 and the motor cylinder 32 are connected to the transmission output shaft 6 and turned together, when the motor cylinder 32 is turned as described above, the pump cylinder 22 is also turned and the revolution speed of the pump casing 20 relative to the pump cylinder 22 becomes low. Therefore, the relationship between the revolution speed Ni of the pump casing 20 and the revolution speed No of the transmission output shaft 6 (that is, the revolution speeds of the pump cylinder 22 and the motor cylinder 32) is expressed by the following equation (1) based on the capacity Vp of the pump and the capacity (Vm) of the motor.

$$Vp(Ni-No)=VmNo \qquad \text{Equation 1}$$

The capacity Vm of the motor can be changed continuously by control for rolling the motor pivot member 35 by means of the motor servo mechanism (SV). Therefore, when the revolution speed Ni of the pump swash plate member 21 is fixed in the above equation (1) and the motor capacity Vm is changed continuously, the control of speed change for changing the revolution of the transmission output shaft 6 continuously is carried out.

When control for reducing the rolling angle of the motor pivot member 35 is carried out, the motor capacity Vm becomes small and when the pump capacity Vp is fixed in the relationship of the above equation (1) and the revolution speed Ni of the pump swash plate member 21 is fixed, control is made to increase the revolution of the transmission output shaft 6 to the revolution speed Ni of the pump swash plate member 21, that is, to change it to the top gear continuously. When the angle of the motor swash plate becomes null, that is, 90°, the change gear ratio (top gear ratio) becomes Ni=No theoretically and the hydraulic locked state is obtained. As a result, the pump casing 20 is turned together with the pump cylinder 22, the motor cylinder 32 and the transmission output shaft 6 to supply mechanical power.

Control for changing the motor capacity continuously is carried out by changing the angle of the motor swash plate by rolling the motor pivot member 35. The motor servo mechanism (SV) for rolling the motor pivot member 35 will be described hereinbelow with reference to FIG. 6 mainly.

Figure 6:
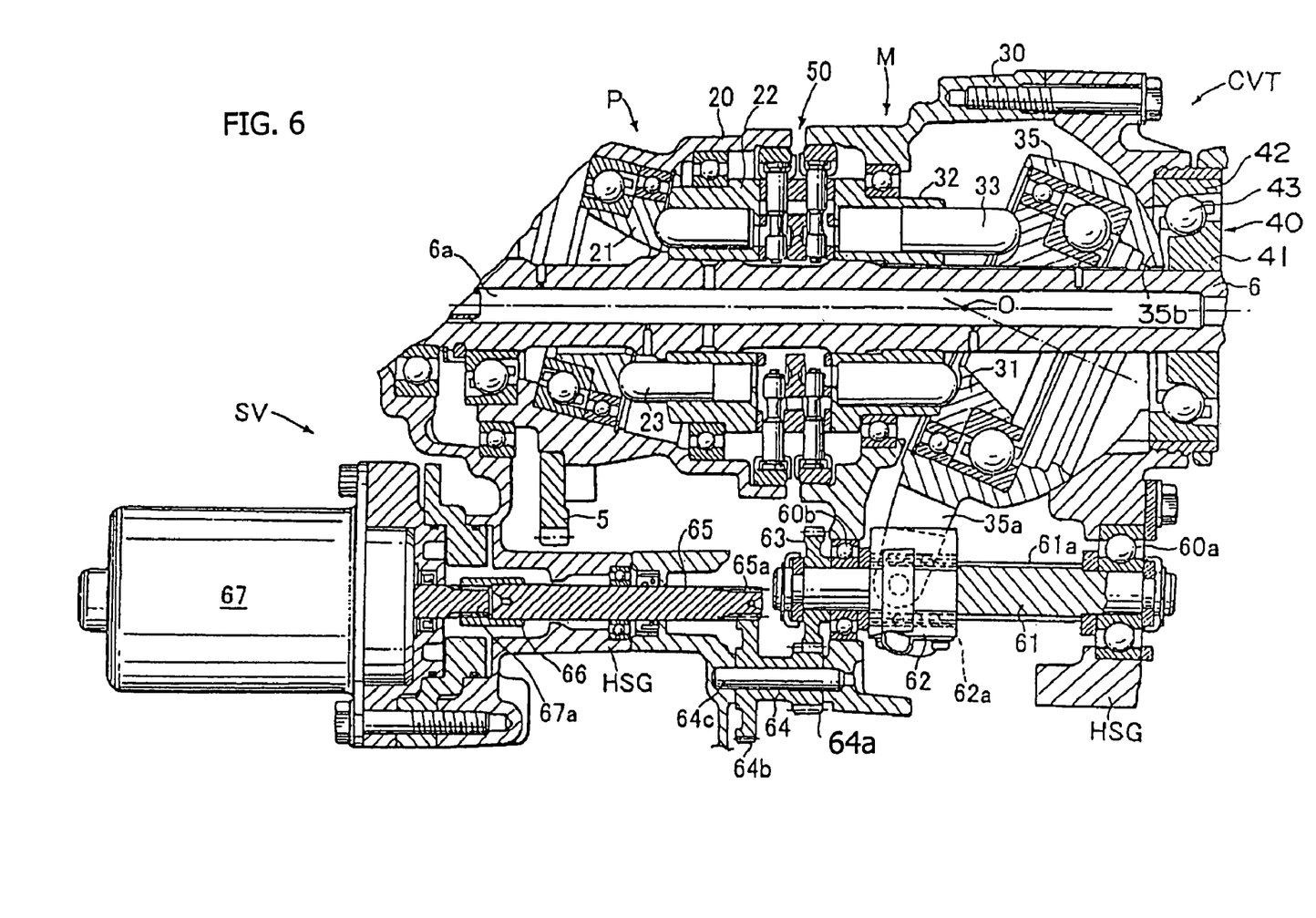
FIG. 6 is a sectional view of the above hydraulic continuously variable transmission according to an embodiment of the present invention.

The motor servo mechanism (SV) comprises a ball screw shaft 61 which is situated in the vicinity of the arm portion 35a of the motor pivot member 35, extends parallel to the transmission output shaft 6 and is supported in the transmission housing (HSG) such that it can turn by bearings 60a and 60b, and a ball nut 62 which is mated with a male screw 61a formed on the outer wall of the ball screw shaft 61. A ball thread 62a is formed by a plurality of balls which are held on the inner wall of the ball nut 62 by a cage and arranged in a screw form and mated with the male screw 61a. The ball nut 62 is connected to the arm portion 35a of the motor pivot member 35 and moved in a horizontal direction over the ball screw shaft 61 to roll the motor pivot member 35 when the ball screw shaft 61 is turned.

To drive the ball screw shaft 61 as described above, a swash plate control motor (electric motor) 67 is attached to the outer end face of the transmission housing (HSG). The drive shaft 67a of the swash plate control motor 67 is connected to a spacer shaft 65 by a coupling 66. This spacer shaft 65 extends beyond the periphery of the input slave gear 5 close to the end portion of the above ball screw shaft 61 and parallel to the transmission output shaft 6 in the transmission housing (HSG) and is rotatably supported in the transmission housing (HSG). An idle shaft 64c which extends parallel to the spacer shaft 65 is supported in the transmission housing (HSG), and an idle gear member 64 is rotatably mounted on this idle shaft 64c.

A first gear 65a is formed at the end of the spacer shaft 65 and engages with a second gear 64b formed integrated with the idle gear member 64. A third gear 64a formed integrated with the idle gear member 64 engages with a fourth gear 63 which is fitted onto the end of the above ball screw shaft 61. Therefore, when the drive shaft 67a is turned by controlling the revolution of the swash plate control motor 67, this revolution is transmitted to the fourth gear member 63 through the idle gear member 64 to turn the ball screw shaft 61, and the ball nut 62 is moved in the horizontal direction over the shaft 61 to roll the motor pivot member 35.

When oil flows through the hydraulic closing circuit to transmit hydraulic force between the hydraulic pump (P) and the hydraulic motor (M) as described above, oil leakage from the hydraulic closing circuit and oil leakage from mating portions between the pump and the motor plunger holes 22a and 32a and mating portions between the pump and the motor plungers 23 and 33 occur. Therefore, a charge oil supply hole 6a extending in the axial direction is formed in the transmission output shaft 6 and connected to a first check valve (CV1) mounted in the pump cylinder 22 through an oil path 6b formed in the transmission output shaft 6 and an oil path 51e formed in the pump cylinder 22 and further to the inner path 56 from the first check valve (CV1) through an oil path 51f as shown in FIG. 7. Therefore, charge oil supplied from a charge oil supply source (not shown) to the charge oil supply hole 6a is supplied into the inner path 56 through the first check valve (CV1) as required.

The charge oil supply hole 6a is connected to a second check valve (CV2) mounted in the pump cylinder 22 through an oil path 6c formed in the transmission output shaft 6 and an oil path 51g formed in the pump cylinder 22 and further to the outer path 57 from the second check valve (CV2) through an oil path 51h. Therefore, the charge oil supplied into the charge oil supply hole 6a is supplied into the outer path 57 through the second check valve (CV2) as required.

As understood from the description of the operations of the hydraulic pump (P) and the hydraulic motor (M), when the hydraulic motor (M) is in a normal running state, that is, is driven with hydraulic oil from the hydraulic pump (P), the inside pressure of the outer path 57 is high and the inside pressure of the inner path 56 is low, whereby the charge oil is supplied into the inner path 56 through the first check valve (CV1). However, when the vehicle is running by using engine brake, the inside pressure of the outer path 57 is low and the inside pressure of the inner path 56 is high, whereby charge oil is supplied into the outer path 57 through the second check valve (CV2).

Figure 8:
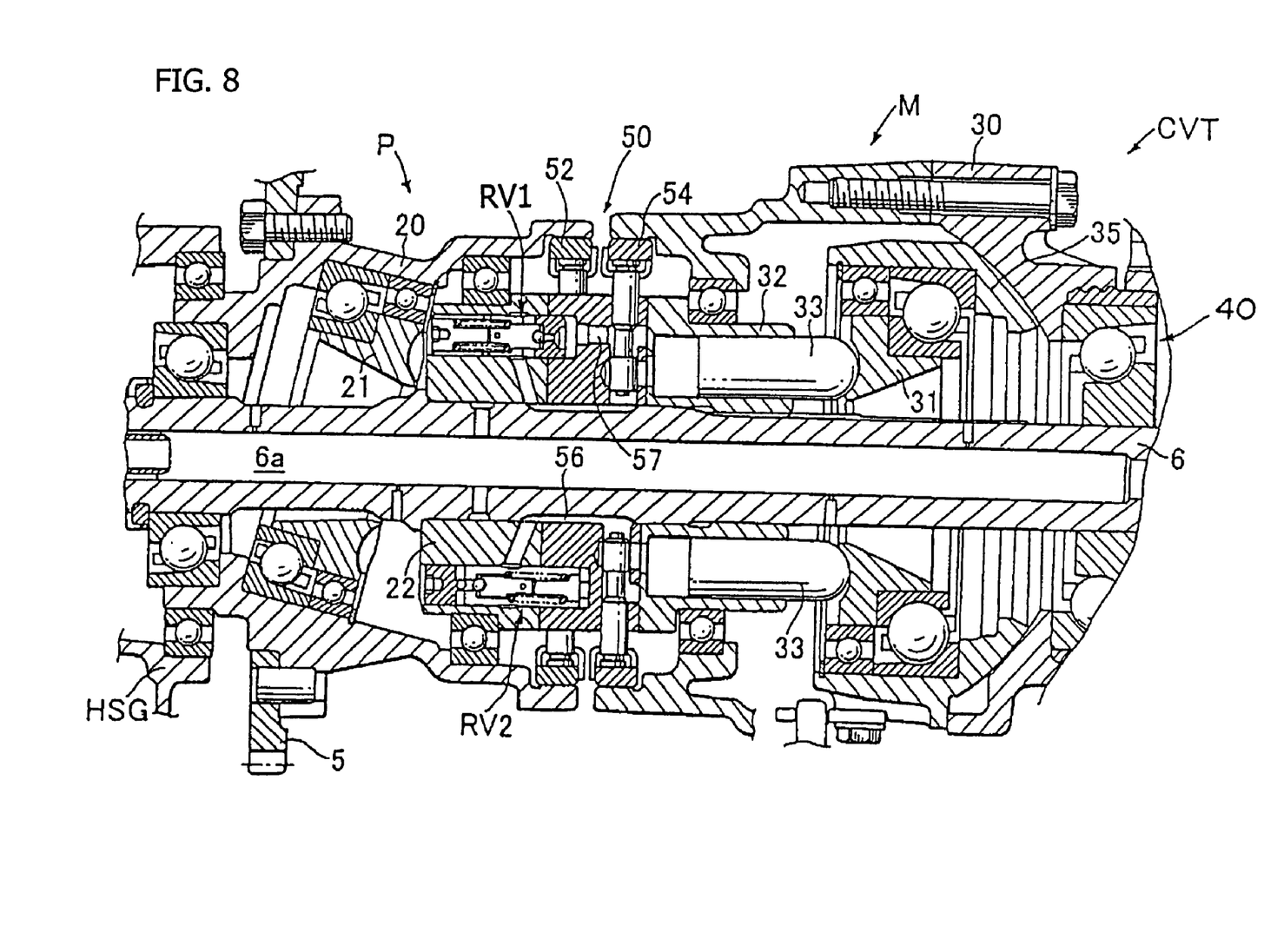
FIG. 8 is still another sectional view of the above hydraulic continuously variable transmission according to an embodiment of the present invention.

As shown in FIG. 8, first and second relief valves (RV1, RV2) are installed in the pump cylinder 22. The first relief valve (RV1) connects the outer path 57 to the inner path 56. When the pressure of oil in the outer path 57 becomes a predetermined level or higher, the first relief valve is opened to escape oil into the inner path 56, thereby preventing the pressure of oil in the outer path 57 from becoming too high. The second relief valve (RV2) connects the inner path 56 to the outer path 57. When the pressure of oil in the inner path 56 becomes a predetermined level or higher, the second relief valve (RV2) is opened to escape oil into the outer path 57, thereby preventing the pressure of oil in the inner path 56 from becoming too high.

As described above, according to the present invention, since a balance portion which is formed rotationally asymmetrical is provided integrated with the outer wall of the casing to balance the rotation of the casing in a hydraulic swash plate plunger unit constituted such that a swash plate member is arranged in the casing rotatably supported in such a manner that it is inclined at a predetermined angle with respect to the central axis of rotation, a counter weight does not need to be used separately, and a weight increase caused by the counter weight which is seen in the prior art can be eliminated.

Preferably, a cylindrical mating portion to be mated with an input gear member which receives driving torque is formed on the outer wall of the casing, a flange portion to which the side face of the input gear member is contacted is formed at the end of the cylindrical mating portion, and this flange portion is formed rotationally asymmetrical to form a balance portion. By using the balance portion as the flange portion to which the end face of the input gear member is contacted to be fixed, the balance portion is used as the flange portion and can be effectively used, thereby making it possible to suppress a weight increase.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

What is claimed is:

1. A hydraulic swash plate plunger unit, comprising:
    a rotatably supported casing having a central axis of rotation and comprising an outer wall comprising a rotationally asymmetrical balance portion,
    a swash plate member installed in the casing and inclined at a predetermined angle with respect to the central axis of rotation,
    a cylinder which is rotatably installed in the casing and has a plurality of plunger holes formed therein extending in an axial direction and arranged in a cylindrical pattern around the central axis of rotation, and
    a plurality of plungers which are slidably disposed in the respective plunger holes;
    wherein the casing is adapted to be rotated relative to the cylinder, so that the outer end portions of the plungers are sequentially pushed in an axial direction by the swash plate member to reciprocate the plungers in the plunger holes,
    and wherein said rotationally asymmetrical balance portion is integrally formed with the outer wall of the casing to balance the rotation thereof.

2. The hydraulic swash plate plunger unit of claim 1, wherein said casing comprises a cylindrical mating portion formed on the outer wall thereof for aligned attachment to an input gear member.

3. The hydraulic swash plate plunger unit of claim 2, wherein said casing further comprises a flange portion formed adjacent the end of the cylindrical mating portion, and wherein said flange portion comprises said rotationally asymmetrical balance portion.

4. The hydraulic swash plate plunger unit of claim 2, wherein said casing further comprises a flange portion formed adjacent the end of the cylindrical mating portion, and wherein said flange portion comprises said rotationally asymmetrical balance portion.

5. The hydraulic swash plate plunger unit of claim 1, wherein said rotationally asymmetrical balance portion is formed in an irregular polygonal shape.

6. The hydraulic swash plate plunger unit of claim 5, wherein said rotationally asymmetrical balance portion has five sides.

7. The hydraulic swash plate plunger unit of claim 5, wherein said rotationally asymmetrical balance portion has five sides.

8. The hydraulic swash plate plunger unit of claim 1, wherein said rotationally asymmetrical balance portion is formed in an irregular polygonal shape.

9. A hydraulic swash plate plunger pump adapted to be rotatably disposed within a transmission housing and comprising:
    a rotatably supported pump casing having a central axis of rotation and comprising an outer wall comprising a rotationally asymmetrical balance portion;
    a pump swash plate member disposed within said pump casing; and
    a pump cylinder disposed within said pump casing and having a plurality of pump plunger holes formed therein to slidably receive a plurality of pump plungers;
    wherein the pump casing is adapted to be rotated relative to the pump cylinder, so that the outer end portions of the pump plungers are sequentially pushed in an axial direction by the pump swash plate member to reciprocate the plungers in the plunger holes,
    and wherein said rotationally asymmetrical balance portion is integrally formed with the outer wall of the pump casing to balance the rotation thereof.

10. The hydraulic swash plate plunger pump of claim 9 wherein said casing comprises a cylindrical mating portion formed on the outer wall thereof for aligned attachment to an input gear member.

11. The hydraulic swash plate plunger pump of claim 10 wherein said casing further comprises a flange portion formed adjacent the end of the cylindrical mating portion, and wherein said flange portion comprises said rotationally asymmetrical balance portion.

12. The hydraulic swash plate plunger pump of claim 11 wherein said rotationally asymmetrical balance portion is formed in an irregular polygonal shape.

13. The hydraulic swash plate plunger pump of claim 12 wherein said rotationally asymmetrical balance portion has five sides.

14. A hydraulic continuously variable transmission, comprising:
    a hollow transmission housing;
    a motor casing disposed within said transmission housing
    a motor pivot member supported by said motor casing;
    a swash plate plunger pump disposed within said housing and comprising:
        a rotatably supported pump casing having a central axis of rotation and comprising an outer wall comprising a rotationally asymmetrical balance portion;
        a pump swash plate member disposed within said pump casing; and
        a pump cylinder disposed within said pump casing and having a plurality of pump plunger holes formed therein to slidably receive a plurality of pump plungers;
    a swash plate plunger motor comprising a motor swash plate and a motor cylinder having a plurality of motor plunger holes formed therein to slidably receive a plurality of motor plungers; and
    an output shaft extending through and supporting said pump cylinder and said motor cylinder, said output shaft being rotatably supported in said housing through a plurality of rotatable bearings;

wherein the pump casing is adapted to be rotated relative to the pump cylinder, so that the outer end portions of the plungers are sequentially pushed in an axial direction by the pump swash plate member to reciprocate the plungers in the plunger holes, and wherein said rotationally asymmetrical balance portion is integrally formed with the outer wall of the pump casing to balance the rotation of the casing.

15. The hydraulic continuously variable transmission of claim 14, wherein said casing comprises a cylindrical mating portion formed on the outer wall thereof for aligned attachment to an input gear member.

* * * * *